United States Patent
Xia et al.

(10) Patent No.: US 12,463,571 B2
(45) Date of Patent: Nov. 4, 2025

(54) FAST ROTOR POSITION ESTIMATION METHOD FOR PERMANENT MAGNET MOTOR BASED ON N-DIVISION APPROACH

(71) Applicants: ZHEJIANG UNIVERSITY ADVANCED ELECTRICAL EQUIPMENT INNOVATION CENTER, Zhejiang (CN); ZHEJIANG UNIVERSITY, Zhejiang (CN)

(72) Inventors: Changliang Xia, Zhejiang (CN); Mengting Ye, Zhejiang (CN); Chen Li, Zhejiang (CN); Zhanqing Zhou, Zhejiang (CN); Yan Yan, Zhejiang (CN); Tingna Shi, Zhejiang (CN)

(73) Assignees: ZHEJIAN UNIVERSITY ADVANCED ELECTRICAL EQUIPMENT INNOVATION CENTER, Zhejiang (CN); ZHEJIANG UNIVERSITY, Zhejiang (CN)

( * ) Notice: Subject to any disclaimer, the term of this patent is extended or adjusted under 35 U.S.C. 154(b) by 157 days.

(21) Appl. No.: 18/586,554

(22) Filed: Feb. 26, 2024

(65) Prior Publication Data

US 2024/0364246 A1 Oct. 31, 2024

Related U.S. Application Data

(63) Continuation of application No. PCT/CN2023/130335, filed on Nov. 8, 2023.

(30) Foreign Application Priority Data

Apr. 28, 2023 (CN) .......................... 202310476313.3

(51) Int. Cl.
*H02P 6/18* (2016.01)
*H02P 21/18* (2016.01)

(52) U.S. Cl.
CPC .................................... *H02P 21/18* (2016.02)

(58) Field of Classification Search
CPC ................................... H02P 6/18; H02P 21/18
(Continued)

(56) References Cited

U.S. PATENT DOCUMENTS

| 6,208,110 B1* | 3/2001 | O'Meara ................. H02P 6/182 |
| | | 318/606 |
| 2014/0117901 A1* | 5/2014 | Gerdes .................... H02P 6/182 |
| | | 318/400.33 |

(Continued)

FOREIGN PATENT DOCUMENTS

| CN | 105262401 | 1/2016 |
| CN | 109347382 | 2/2019 |

(Continued)

OTHER PUBLICATIONS

"International Search Report (Form PCT/ISA/210) of PCT/CN2023/130335," mailed on Jan. 10, 2024, pp. 1-3.

(Continued)

*Primary Examiner* — Gabriel Agared
(74) *Attorney, Agent, or Firm* — JCIPRNET (57) ABSTRACT

A method for quickly determining the rotor position of a permanent magnet motor using the N-division approach is provided. The method involves converting the motor's three-phase stator current coordinates into the dq two-phase synchronous rotation coordinate system and identifying the initial rotor position area. By establishing a stator current cost model and utilizing the d-axis stator current, the initial rotor position can be obtained. Subsequently, the N-division approach is employed for iterative optimization to obtain the estimated rotor position and the final position region, leading to a rapid estimation of the permanent magnet motor's rotor position. This method incorporates the finite set model (Continued)

predictive control concept into a phase-locked loop based on stator current, eliminating the need for additional rotor position polarity judgment and invalid rotor position control variables.

5 Claims, 4 Drawing Sheets

(58) Field of Classification Search
USPC .................................................... 318/400.01
See application file for complete search history.

(56) References Cited

U.S. PATENT DOCUMENTS

| | | | | |
|---|---|---|---|---|
| 2014/0176129 A1* | 6/2014 | Si | ........................... | G01D 5/245 |
| | | | | 324/207.25 |
| 2021/0257945 A1* | 8/2021 | Goetting | ............... | H02P 29/032 |
| 2022/0158577 A1 | 5/2022 | Beciu et al. | | |

FOREIGN PATENT DOCUMENTS

| | | |
|---|---|---|
| CN | 113691186 | 11/2021 |
| CN | 116667726 | 8/2023 |

OTHER PUBLICATIONS

"Written Opinion of The International Searching Authority (Form PCT/ISA/237) of PCT/CN2023/130335," mailed on Jan. 10, 2024, pp. 1-3.

* cited by examiner

FAST ROTOR POSITION ESTIMATION METHOD FOR PERMANENT MAGNET MOTOR BASED ON N-DIVISION APPROACH

CROSS-REFERENCE TO RELATED APPLICATION

This application is a continuation of international application of PCT application serial no. PCT/CN2023/130335, filed on Nov. 8, 2023, which claims the priority benefit of China application no. 202310476313.3, filed on Apr. 28, 2023. The entirety of each of the above mentioned patent applications is hereby incorporated by reference herein and made a part of this specification.

BACKGROUND

Technical Field

The invention relates to a rotor position fast estimation method, in particular to a permanent magnet motor rotor position fast estimation method based on the N-division approach.

Description of Related Art

Permanent magnet synchronous motors have proven to be highly beneficial in various industries, including new energy vehicles, aerospace, flywheel energy storage, and national defense. They offer unique advantages in terms of volume, weight, and reliability. However, to achieve high-performance motor control, determining the rotor position is crucial. Traditionally, mechanical position sensors, such as photoelectric encoders and rotary transformers, have been used to obtain the rotor position. Unfortunately, this method also increases the connection line between the motor and the control system while decreasing the power density of the system. Additionally, these mechanical sensors are vulnerable to interference from motor vibration, temperature, and electromagnetic noise, which can compromise the reliability of the drive system. As a result, sensorless control technology has emerged as a viable alternative. This technology employs the mathematical model of the back electromotive force or flux linkage of a permanent magnet synchronous motor to design an observer and then utilizes rotor position demodulation technology to estimate the rotor position of the motor from the observed back electromotive force or flux linkage.

When utilizing sensorless control for permanent magnet synchronous motors, a sliding mode observer is commonly utilized to monitor the back electromotive force that includes the rotor position information. The observed rotor position is then demodulated through a straightforward and uncomplicated phase-locked loop (PLL). Nevertheless, a buffeting issue arises in the sliding mode observer that can result in a decrease in the performance of the permanent magnet synchronous motor's control. Traditional PLLs come with a proportional integral regulator that possesses a fixed gain value established through experience, leading to weak robustness. Furthermore, blending a sliding mode observer and PLL will also decrease the system bandwidth, affecting the dynamic performance of sensorless control for permanent magnet synchronous motors.

Extensive research has been conducted by scholars worldwide to address the challenges associated with traditional PLL. One common approach employed currently is the use of an additional Kalman filter to determine the PLL parameters. This method has proven effective in enhancing the poor robustness of traditional PLL parameters determined solely by experience. To further enhance the system's bandwidth, some scholars have proposed the finite position set-phase locked loop (FPS-PLL) method, based on the fundamental concept of finite control set model predictive control. Unlike other approaches, this method does not require an observer and can directly estimate the rotor position. The approach involves dividing the rotor position plane into a finite number of rotor positions and using the mathematical model of the motor under the rotating coordinate system. A cost function based on back electromotive force is then constructed, and the rotor position is estimated by rolling optimization. This method boasts of fast dynamic response and strong robustness. Building on this, some scholars have developed two improved FPS-PLL schemes that can reduce the calculation amount while ensuring the accuracy of rotor position estimation. Although these schemes require 24 iterations of the optimization process, they remain crucial in obtaining more precise rotor position information for permanent magnet synchronous motors. Estimating a more accurate rotor position within a shorter control period is vital in improving the sensorless control performance of permanent magnet synchronous motors and increasing the control frequency of the system to ensure a large enough carrier ratio.

SUMMARY

The invention presents a fast rotor position estimation method of a permanent magnet motor utilizing the N-division method. With its ability to generate a more precise estimation of the rotor position in a shorter control period, it significantly enhances the permanent magnet synchronous motors' sensorless control performance. Consequently, it effectively resolves the issues encountered in the background technology.

The technical scheme adopted by the invention is:

The fast rotor position estimation method of the permanent magnet motor based on the N-division approach comprises the following steps:

Step 1: the three-phase stator currents of the permanent magnet motor sampled at each period are converted by coordinate transform to obtain the stator currents in the dq two-phase synchronous rotation coordinate system, with which the initial position area of the permanent magnet motor's rotor position is determined.

Step 2: the stator current cost model of the permanent magnet motor is established. The d-axis stator current of the permanent magnet motor in the dq two-phase synchronous rotation coordinate system is inputted into the stator current cost model and the initial rotor position of the permanent magnet motor is outputted. The initial rotor position of the permanent magnet motor and its initial position region are iteratively optimized by the N-division approach to obtain the estimated rotor position and its final position region. As a result, the rotor position of the permanent magnet motor is quickly estimated.

In Step 1, the three-phase stator currents of the permanent magnet motor sampled at each period are converted by coordinate transform to obtain the stator currents of the permanent magnet motor in the dq two-phase synchronous rotation coordinate system. Firstly, the A-phase stator currents $i_a$, B-phase stator currents $i_b$ and C-phase stator currents $i_c$ of the permanent magnet motors are converted by coordinate transform to obtain the α-axis stator currents $i_\alpha$ and β-axis stator currents $i_β$ in the αβ two-phase stationary coordinate system, respectively. Then, the d-axis stator current $i_d$ and q-axis stator current $i_q$ in the dq two-phase synchronous rotation coordinate system are obtained by the coordinate transform with α-axis stator current $i_α$ and β-axis stator current $i_β$. The initial position region of the permanent magnet motor's rotor position is determined according to the polarity of α-axis stator current $i_α$, β-axis stator current $i_β$ and q-axis stator current $i_q$.

The initial position area of the permanent magnet motor's rotor position is determined according to the polarity of the α phase current $i_α$, β phase current $i_β$ and q phase current $i_q$, which is as shown as follows:

| $i_α$ | $i_β$ | $i_q$ | Position area number | Initial position area |
|---|---|---|---|---|
| + | + | + | I | [1.5π, 2π] ↑ |
|   |   | − | II | [0.5π, π] ↓ |
| − | + | + | III | [0, 0.5π] ↑ |
|   |   | − | IV | [π, 1.5π] ↓ |
| − | − | + | V | [0.5π, π] ↑ |
|   |   | − | VI | [1.5π, 2π] ↓ |
| + | − | + | VII | [π, 1.5π] ↑ |
|   |   | − | VIII | [0, 0.5π] ↓ | where ↑ and ↓ indicate monotonically increasing and decreasing, respectively.

In Step 2, the stator current cost model of the permanent magnet motor is established by the d-axis current control mode of the permanent magnet synchronous motor in the dq two-phase rotating coordinate system as follows:

$$g_{op}(k) = |i_{dref}(k) - i_d(k)|$$

where $g_{op}(k)$ is the d-axis stator current error of the permanent magnet motor at the kth sample period in the dq two-phase synchronous rotation coordinate system. $i_{dref}(k)$ is the d-axis stator current reference of the permanent magnet motor at the kth sampling period in dq two-phase synchronous rotation coordinate system. $i_d(k)$ is the d-axis stator current of a permanent magnet motor at the kth sample period in the dq two-phase synchronous rotation coordinate system.

The d-axis stator current of the permanent magnet motor in the dq two-phase synchronous rotation coordinate system at the kth sample period, $i_d(k)$, is as follows:

$$i_d(k) = A\sin(θ + φ_k)$$

where A is the stator current amplitude of the permanent magnet motor, θ is the initial rotor position of the permanent magnet motor, $φ_k$ is the angle between the stator current and the two-phase stationary coordinate system of the permanent magnet motor at the kth sample period $i_d(k)=A \sin(θ+φ_k)$, is the math model after math transform with $i_d(k)=i_α(k)\cos θ+i_β(k)\sin θ$.

The angle between the stator current and the two-phase stationary coordinate system of the permanent magnet motor at the kth sample period, $φ_k$, is as follows:

$$φ_k = \arctan(i_α(k)/i_β(k))$$

where $i_α(k)$ and $i_β(k)$ are the α-axis and β-axis stator currents of the permanent magnet motor at the kth sample period in αβ two-phase stationary coordinate system, respectively.

In Step 2, using the monotonicity of $i_d(k)$ with the discrete rotor position control variable in each selected rotor position region, the initial rotor position of the permanent magnet motor and its initial position region are iterated and optimized by the N-division approach to obtain the estimated rotor position of the permanent magnet motor and its final position region. A position region obtained in a current iteration is (1/(N−1)) of a position region obtained in a last iteration, guaranteeing that the optimized rotor position region in each iteration is effective. The estimated rotor position obtained by the iteration is as follows:

$$\hat{θ}_i = (θ_{(i+1)1} + θ_{(i+1)N})/2$$

where $\hat{θ}_i$ is the rotor position estimation value of the permanent magnet motor in the ith iteration, $θ_{(i+1)1}$ and $θ_{(i+1)N}$ are the first and Nth rotor position control variables of the permanent magnet motor's rotor position estimation value in the (i+1)th iteration, respectively.

The optimization is completed after M iterations and the final estimated rotor position of the permanent magnet motor, $\hat{θ}(k)$, is $(θ_{(M+1)1} + θ_{(M+1)N})/2$.

The first and Nth rotor position control variables of the permanent magnet motor's rotor position estimation value in the (i+1)th iteration are:

$$\begin{cases} θ_{(i+1)1} = \max\{θ_{ij} \mid i_{dij}(k) < 0\} \\ θ_{(i+1)N} = \min\{θ_{ij} \mid i_{dij}(k) > 0\} \end{cases} i_q(k) > 0$$

$$\begin{cases} θ_{(i+1)1} = \min\{θ_{ij} \mid i_{dij}(k) > 0\} \\ θ_{(i+1)N} = \max\{θ_{ij} \mid i_{dij}(k) < 0\} \end{cases} i_q(k) < 0$$

where $θ_{ij}$ is the jth rotor position control variable of the permanent magnet motor in the ith iteration, $i_{dij}(k)$ is the d-axis stator current in the dq two-phase synchronous rotation coordinate system of the permanent magnet motor at the kth sample period under the jth rotor position control variable in the ith iteration, $i_q(k)$ is the q-axis stator current in the dq two-phase synchronous rotation coordinate system of the permanent magnet motor at the kth sample period.

$θ_{ij}$, the jth rotor position control variable of the permanent magnet motor in the ith iteration, is shown as follows:

$$θ_{ij} = \frac{j-1}{N-1}(θ_{iN} - θ_{iN}) + θ_{i1} \quad j \in \{1, 2, \ldots N\}$$

where $θ_{iN}$ and $θ_{i1}$ are the Nth and first rotor position control variables of the rotor position estimation value for the permanent magnet motor in the ith iteration, respectively.

The invention yields several significant benefits.

Firstly, the stator current characteristics of the permanent magnet synchronous motor divide the rotor position plane into eight regions, thus optimizing the estimated rotor position without the need for an additional rotor position polarity judgment method. This results in a reduction of the calculation amount required.

Secondly, the invention employs the d-axis current control mode of the motor in the dq two-phase synchronous rotating coordinate system to construct a cost function model based on the stator current. Compared to the traditional method constructing a cost function based on the back electromotive force, the invention reduces the calculation amount.

Thirdly, the rotor position region of each iteration is defined as the (1/(N−1)) of the last iteration's rotor position region with the N-division approach, ensuring that each iteration's rotor position region is effective. It reduces the algorithm's calculation amount on the premise of the accurate rotor position estimation.

Finally, the invention rapidly estimates the rotor position using the FPS-PLL without requiring additional observers to observe the back electromotive force or flux linkage containing the rotor position information. This significantly improves the system bandwidth and contributes to the enhancement of the dynamic performance for the permanent magnet synchronous motor sensorless control.

The rotor position estimation method of the invention utilizes a finite set model predictive control within a PLL that is based on the stator current. It identifies a pre-divided rotor position area using the characteristics of the sampled stator current. Subsequently, it creates a cost function based on the stator current within the selected rotor position area and accurately estimates the rotor position using the N-division method. The significant advantage of this technique is that it eradicates the need for an extra rotor polarity determination method and prevents any invalid rotor position control variables. Consequently, the computational burden is reduced, while the precision of the rotor position estimation is maintained. This makes it more suitable for the digital implementation of the permanent magnet synchronous motors sensorless control.

DESCRIPTION OF THE EMBODIMENTS

The invention is further explained in detail in combination with the attached drawings and specific embodiments.

Figure 1:
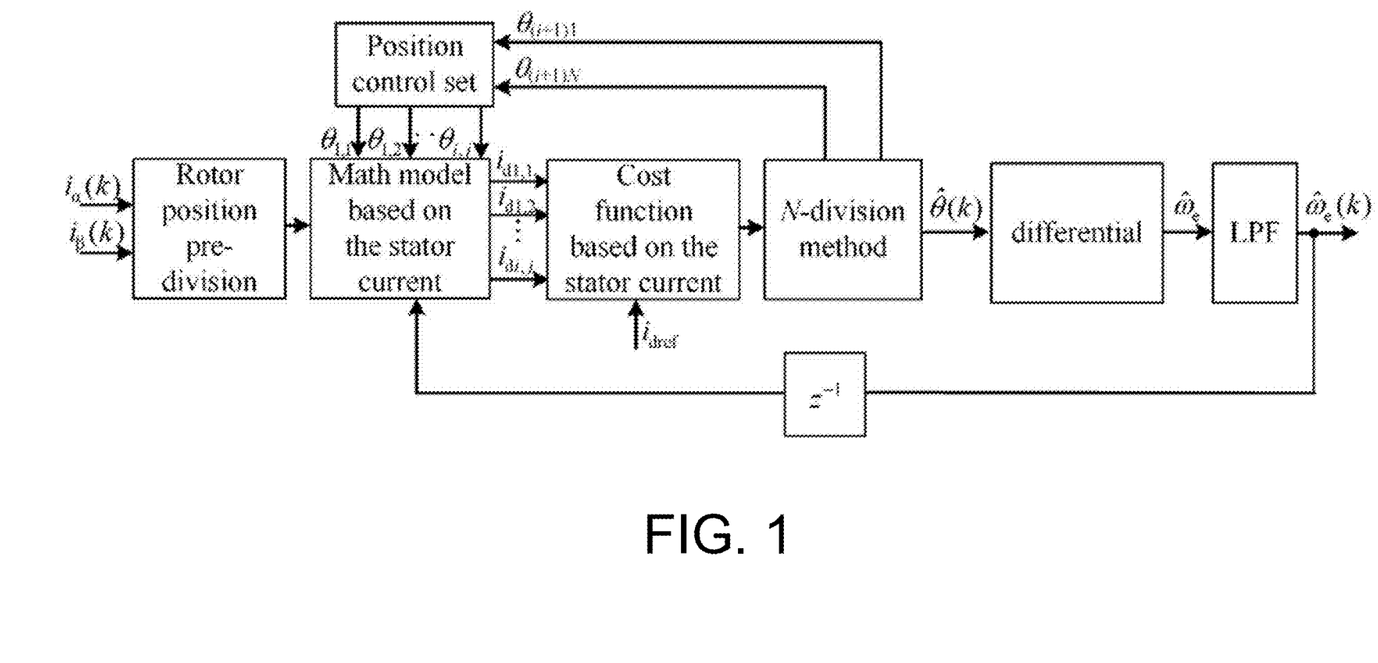
FIG. 1 is a structure block diagram of the method according to the invention.

As shown in FIG. 1, the fast rotor position estimation method of the permanent magnet motor based on the N-division approach comprises the following steps:

Step 1: the three-phase stator currents of the permanent magnet motor sampled at each period are converted by coordinate transform to obtain the stator currents in the dq two-phase synchronous rotation coordinate system, with which the initial position area of the permanent magnet motor's rotor position is determined.

In Step 1, the three-phase stator currents of the permanent magnet motor sampled at each period is converted by coordinate transform to obtain the stator currents of the permanent magnet motor in the dq two-phase synchronous rotation coordinate system. Firstly, the A-phase stator currents $i_a$, B-phase stator currents $i_b$ and C-phase stator currents $i_c$ of the permanent magnet motors are converted by coordinate transform to obtain the α-axis stator currents $i_\alpha$ and β-axis stator currents $i_\beta$ in the αβ two-phase stationary coordinate system, respectively. Then, the d-axis stator current $i_d$ and q-axis stator current $i_q$ in the dq two-phase synchronous rotation coordinate system are obtained by the coordinate transform with α-axis stator current $i_\alpha$ and β-axis stator current $i_\beta$. The initial position region of the permanent magnet motor's rotor position is determined according to the polarity of α-axis stator current $i_\alpha$, β-axis stator current $i_\beta$ and q-axis stator current $i_q$.

The initial position region of the permanent magnet motor's rotor position is determined according to the polarity of α-axis stator current $i_\alpha$, β-axis stator current $i_\beta$ and q-axis stator current $i_q$, which is shown as follows:

| $i_\alpha$ | $i_\beta$ | $i_q$ | Position area number | Initial position area |
|---|---|---|---|---|
| + | + | + | I | $[1.5\pi, 2\pi]$ ↑ |
| + | + | − | II | $[0.5\pi, \pi]$ ↓ |
| − | + | + | III | $[0, 0.5\pi]$ ↑ |
| − | + | − | IV | $[\pi, 1.5\pi]$ ↓ |
| − | − | + | V | $[0.5\pi, \pi]$ ↑ |
| − | − | − | VI | $[1.5\pi, 2\pi]$ ↓ |
| + | − | + | VII | $[\pi, 1.5\pi]$ ↑ |
| + | − | − | VIII | $[0, 0.5\pi]$ ↓ | where ↑ and ↓ indicate monotonically increasing and decreasing, respectively.

Step 2: the stator current cost model of the permanent magnet motor is established. The d-axis stator current of the permanent magnet motor in the dq two-phase synchronous rotation coordinate system is inputted into the stator current cost model and the initial rotor position of the permanent magnet motor is outputted. The initial rotor position of the permanent magnet motor and its initial position region are iteratively optimized by the N-division approach to obtain the estimated rotor position and its final position region. As a result, the rotor position of the permanent magnet motor is quickly estimated.

In Step 2, the stator current cost model of the permanent magnet motor is established by the d-axis current control mode of the permanent magnet synchronous motor in the dq two-phase rotating coordinate system as follows:

$$g_{op}(k) = |i_{dref}(k) - i_d(k)|$$

where $g_{op}(k)$ is the d-axis stator current error of the permanent magnet motor at the kth sample period in the dq two-phase synchronous rotation coordinate system. $i_{dref}(k)$ is the d-axis stator current reference of the permanent magnet motor at the kth sampling period in dq two-phase synchronous rotation coordinate system. $i_d(k)$ is the d-axis stator current of a permanent magnet motor at the kth sample period in the dq two-phase synchronous rotation coordinate system.

The d-axis stator current of the permanent magnet motor in the dq two-phase synchronous rotation coordinate system at the kth sample period, $i_d(k)$, is as follows:

$$i_d(k) = A\sin(\theta + \varphi_k)$$

where A is the stator current amplitude of the permanent magnet motor, θ is the initial rotor position of the permanent magnet motor, $\varphi_k$ is the angle between the stator current and the two-phase stationary coordinate system of the permanent magnet motor at the kth sample period, $i_d(k)=A \sin(\theta+\varphi_k)$, is the math model after math transform with $i_d(k)=i_\alpha(k) \cos\theta + i_\beta(k) \sin\theta$.

The angle between the stator current and the two-phase stationary coordinate system of the permanent magnet motor at the kth sample period, $\varphi_k$, is as follows:

$$\varphi_k = \arctan(i_\alpha(k)/i_\beta(k))$$

where $i_\alpha(k)$ and $i_\beta(k)$ are the $\alpha$-axis and $\beta$-axis stator currents of the permanent magnet motor at the kth sample period in $\alpha\beta$ two-phase stationary coordinate system, respectively.

In Step 2, using the monotonicity of $i_d(k)$ with the discrete rotor position control variable in each selected rotor position region, the initial rotor position of the permanent magnet motor and its initial position region are iterated and optimized by the N-division approach to obtain the estimated rotor position of the permanent magnet motor and its final position region. A position region obtained in a current iteration is $(1/(N-1))$ of a position region obtained in a last iteration, guaranteeing that the optimized rotor position region in each iteration is effective. The estimated rotor position obtained by the iteration is as follows:

$$\hat{\theta}_i = (\theta_{(i+1)1} + \theta_{(i+1)N})/2$$

where $\hat{\theta}_i$ is the rotor position estimation value of the permanent magnet motor in the ith iteration, $\theta_{(i+1)1}$ and $\theta_{(i+1)N}$ are the first and Nth rotor position control variables of the permanent magnet motor's rotor position estimation value in the (i+1)th iteration, respectively.

The optimization is completed after M iterations and the final estimated rotor position of the permanent magnet motor, $\hat{\theta}(k)$, is $(\theta_{(M+1)1} + \theta_{(M+1)N})/2$.

The first and Nth rotor position control variables of the permanent magnet motor's rotor position estimation value in the (i+1)th iteration are:

$$\begin{cases} \theta_{(i+1)1} = \max\{\theta_{ij} \mid i_{dij}(k) < 0\} \\ \theta_{(i+1)N} = \min\{\theta_{ij} \mid i_{dij}(k) > 0\} \end{cases} i_q(k) > 0$$

$$\begin{cases} \theta_{(i+1)1} = \min\{\theta_{ij} \mid i_{dij}(k) > 0\} \\ \theta_{(i+1)N} = \max\{\theta_{ij} \mid i_{dij}(k) < 0\} \end{cases} i_q(k) < 0$$

where $\theta_{ij}$ is the jth rotor position control variable of the permanent magnet motor in the ith iteration, $i_{dij}(k)$ is the d-axis stator current in the dq two-phase synchronous rotation coordinate system of the permanent magnet motor at the kth sample period under the jth rotor position control variable in the ith iteration, $i_q(k)$ is the q-axis stator current in the dq two-phase synchronous rotation coordinate system of the permanent magnet motor at the kth sample period.

$\theta_{ij}$, the jth rotor position control variable of the permanent magnet motor in the ith iteration, is shown as follows:

$$\theta_{ij} = \frac{j-1}{N-1}(\theta_{iN} - \theta_{i1}) + \theta_{i1} \quad j \in \{1, 2, \ldots N\}$$

where $\theta_{iN}$ and $\theta_{i1}$ are the Nth and first rotor position control variables of the rotor position estimation value for the permanent magnet motor in the ith iteration, respectively.

The specific implementation of the invention is as follows:

The fast rotor position estimation method for the permanent magnet motor in the embodiment of the invention is as follows:

Step 1: determine the area where the rotor is located:

At the kth cycle, the stator currents in the $\alpha\beta$ two-phase stationary coordinate system $i_\alpha(k)$ and $i_\beta(k)$ are obtained from the three-phase stator currents $i_a(k)$, $i_b(k)$ and $i_c(k)$ sampled with the current sensor by coordinate transformation. The expression is as follows:

$$\begin{bmatrix} i_\alpha(k) \\ i_\beta(k) \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_a(k) \\ i_b(k) \\ i_c(k) \end{bmatrix}$$

The stator current components of permanent magnet synchronous motor in the dq two-phase synchronous rotation coordinate system, $i_d(k)$ and $i_q(k)$, can be obtained through the coordinate transform of the stator current components in $\alpha\beta$ two-phase stationary coordinate system, $i_\alpha(k)$ and $i_\beta(k)$. The expressions are as follows:

$$i_d(k) = i_\alpha(k)\cos\theta + i_\beta(k)\sin\theta = A\sin(\theta + \varphi_k)$$

$$i_q(k) = -i_\alpha(k)\sin\theta + i_\beta(k)\cos\theta = A\sin\left(\theta + \varphi_k + \frac{\pi}{2}\right)$$

where, $\theta$ is the rotor position, A is the amplitude of the stator current, $A^2 = i_\alpha^2(k) + i_\beta^2(k)$, $\varphi_k = \arctan(i_\alpha(k)/i_\beta(k))$.

According to the polarity of the stator currents $i_\alpha(k)$, $i_\beta(k)$ and $i_q(k)$, the whole rotor position plane can be divided into eight regions. The polarity of the sampled stator currents is used to determine the region where the rotor position is located: when $i_\alpha(k) > 0$, $i_\beta(k) > 0$, $0 \leq \varphi_k < 0.5\pi$. If $i_q(k) > 0$, the rotor position is located in the region I. Otherwise, the rotor position is in region II. When $i_\alpha(k) < 0$, $i_\beta(k) > 0$, $0.5\pi \leq \varphi_k < \pi$, if $i_q(k) > 0$, the rotor position is in region III. On the contrary, the rotor position is in region IV. When $i_\alpha(k) < 0$, $i_\beta(k) < 0$, $\pi \leq \varphi_k < 1.5\pi$. If $i_q(k) > 0$, the rotor position is located in region V. Otherwise, the rotor position is in region VI. When $i_\alpha(k) > 0$, $i_\beta(k) > 0$, $1.5\pi \leq \varphi_k < 2\pi$. If $i_q(k) > 0$, the rotor position is located in region VII. Otherwise, the rotor position is in region VIII.

Step 2: estimate the rotor position in the selected rotor position area:

S2-1: using the d-axis current control mode of the permanent magnet synchronous motor in the dq two-phase rotating coordinate system, the mathematical model based on stator current characteristics is obtained, and cost function based on stator current is constructed.

S2-2: in the selected rotor position region, according to the constructed stator current coat function and the monotonicity of stator current in the selected rotor position region, the rotor position region optimized in each iteration is defined as that of the previous iteration (1/(N−1)) based on the N-division method. As a result, the rotor position can be quickly estimated.

In S2-1, the mathematical model based on the stator current for the permanent magnet synchronous motor is $i_d(k)=i_\alpha(k)\cos\theta+i_\beta(k)\sin\theta=A\sin(\theta+\varphi_k)$. Among them, $i_\alpha(k)$ and $i_\beta(k)$ are the stator current components in the $\alpha\beta$ two-phase stationary coordinate system at period, $i_d(k)$ is the d-axis component of the stator current in the two-phase rotating coordinate system at the kth sample period, A is the stator current amplitude, $\theta$ is the rotor position, $\varphi_k=\arctan(i_\alpha(k)/i_\beta(k))$. According to the mathematical model based on the current, the current cost function is constructed as $g_{op}(k)=|i_{dref}(k)-i_d(k)|$, where $i_{dref}(k)$ is the d-axis stator current reference in the two-phase rotating coordinate system at the kth sample period.

In S2-2, in the selected rotor position area, the d-axis current in the dq two-phase synchronous rotation coordinate system of the permanent magnet synchronous motor adopts the control mode of $i_d=0$, that is, $i_{dref}(k)=0$, and the cost function based on the stator current is as follows:

$$g_{op}(k) = |0 - i_d(k)| = |i_\alpha(k)\cos\theta + i_\beta(k)\sin\theta = |A\sin(\theta + \varphi_k)||$$

According to the constructed stator current cost function, $i_d(k)$ has monotonicity with the change of discrete rotor position control variables in each selected rotor position region. In area I, for example, rotor position meets the condition of $1.5\pi\leq\theta\leq 2\pi$, $i_d(k)$ increases monotonously with $\theta$. This means that $i_d(k)$ has only one null point. Namely, in the selected position area, $i_d(k)$ has opposite signs at the two endpoints. When $\theta_{11}=1.5\pi$, $i_d(k)<0$ and $i_d(k)>0$ when $\theta_{1N}=2\pi$. $\theta_{ij}$ indicates the jth position control variable during the ith iteration. On this basis, the rotor position region optimized in each iteration is defined as (1/(N−1)) of the previous iteration based on the N-division method, that is, the rotor position region is equally divided into (N−1) small regions in each iteration, and N discrete rotor position control variables are obtained. Based on the constructed mathematical model of stator current, two adjacent rotor position control variables that change the polarity of $i_d(k)$ can be searched according to the polarity of $i_q(k)$, or two adjacent rotor position control variables that minimize the cost function can be searched based on the constructed stator current cost function, which can be used as the rotor position region for optimization in the next iteration. In this way, it can be determined that the discrete rotor position control variables for each iteration process is effective, and the calculation amount and execution time are further reduced. The optimization is repeated until the optimization is completed after M iterations, and the final estimated rotor position is equal to $(\theta_{(M+1)1}+\theta_{(M+1)N})/2$. The estimated speed is obtained by differential and low-pass filter LPF in turn of the final estimated rotor position. The N discrete rotor position control variables obtained in each iteration optimization process are as follows:

$$\theta_{ij} = \frac{j-1}{N-1}(\theta_{iN} - \theta_{i1}) + \theta_{i1} \quad j \in \{1, 2, \ldots N\}$$

The start position of the next iteration $\theta_{(i+1)1}$ and the end position $\theta_{(i+1)N}$ are:

$$\begin{cases} \theta_{(i+1)1} = \max\{\theta_{ij} \mid i_{dij}(k) < 0\} \\ \theta_{(i+1)N} = \min\{\theta_{ij} \mid i_{dij}(k) > 0\} \end{cases} i_q(k) > 0$$

$$\begin{cases} \theta_{(i+1)1} = \min\{\theta_{ij} \mid i_{dij}(k) > 0\} \\ \theta_{(i+1)N} = \max\{\theta_{ij} \mid i_{dij}(k) < 0\} \end{cases} i_q(k) < 0$$

Figure 2:
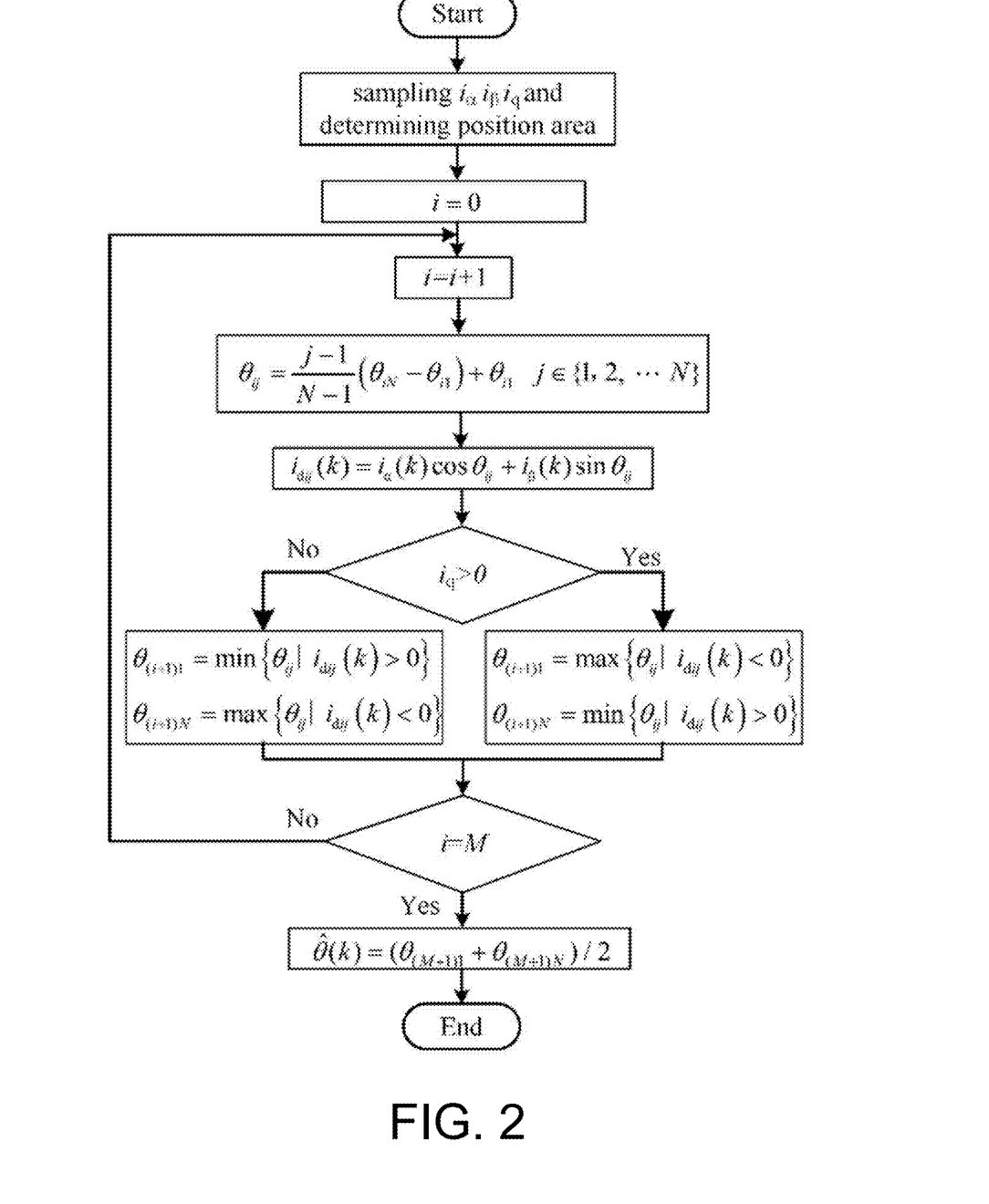
FIG. 2 is a flow chart of the method according to the invention.

The flow block diagram of the invention method is shown in FIG. 2. The first rotor position iteration area $[\theta_{11},\theta_{1N}]$ and the monotony analysis results of $i_d(k)$ changing with $\theta$ in this area are shown in Table 1. "↑" indicates monotone increasing and "↓" indicates monotone decreasing. Taking M=6 and N=4 as an example, the invention method requires a total of 14 given rotor position control variables to be searched, and the calculation of each control variables requires 2 coordinate transformation. The maximum error of the final estimated rotor position is 0.001077 rad. Compared with the traditional method constructing the cost function based on the back electromotive force, the calculation amount of the invention method is reduced by 61.1%.

TABLE 1

| $i_\alpha$ | $i_\beta$ | $i_q$ | Position area number | Initial position area |
|---|---|---|---|---|
| + | + | + | I | $[1.5\pi, 2\pi]$ ↑ |
|   |   | − | II | $[0.5\pi, \pi]$ ↓ |
| − | + | + | III | $[0, 0.5\pi]$ ↑ |
|   |   | − | IV | $[\pi, 1.5\pi]$ ↓ |
| − | − | + | V | $[0.5\pi, \pi]$ ↑ |
|   |   | − | VI | $[1.5\pi, 2\pi]$ ↓ |
| + | − | + | VII | $[\pi, 1.5\pi]$ ↑ |
|   |   | − | VIII | $[0, 0.5\pi]$ ↓ |

To demonstrate the effectiveness of the invention method, a test platform of a permanent magnet synchronous motor sensorless control system is built. The motor used for the test is a permanent magnet motor, using double closed-loop mode of speed and current, and space vector modulation to generate SVPWM waveform. A two-level inverter is used to drive the motor. The PI controllers with a simple structure and easy implementation are used for the speed and current loop controller. The platform is used to test the rotor position optimization performance of the invention method. The parameters of the permanent magnet synchronous motor tested can be found in Table 2.

TABLE 2

| Motor parameters | | |
|---|---|---|
| Parameters mean | Parameter value | Unit |
| Rated voltage | 380 | V |
| Rated current | 4.2 | A |
| Rated torque | 0.4 | N · m |
| Pole pairs | 1 | pair |
| Resistance | 1.2 | Ω |
| Permanent magnet flux | 0.00006 | wb |
| d-axis and q-axis inductances | 2.15 | mH |

Figure 3:
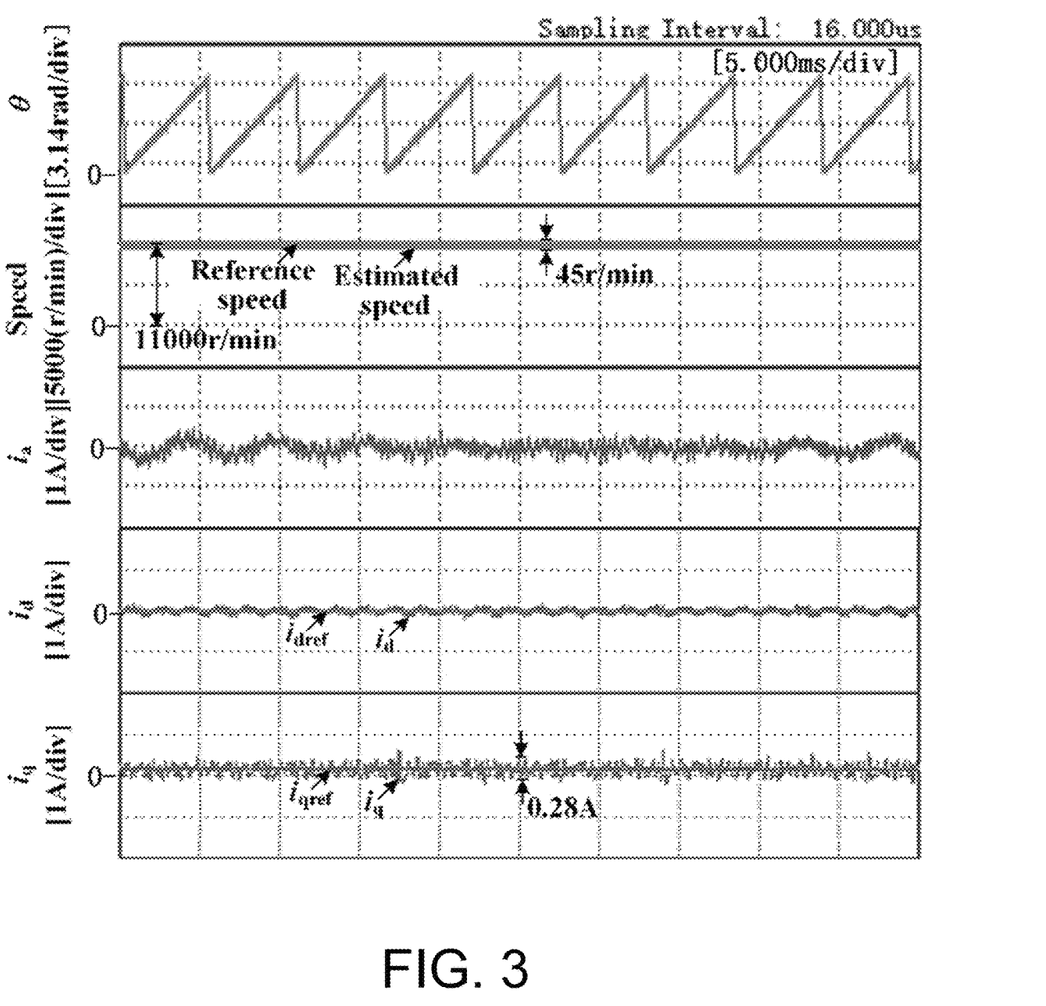
FIG. 3 is the experiment waveform showing the steady-state performance of the method according to the invention.

The permanent magnet synchronous motor uses the invention method to run stably at 11000 r/min, and its experimental waveform is shown in FIG. 3. From top to bottom are the estimated rotor position, reference speed and estimated speed, a phase current $i_a$, d-axis reference current $i_{dref}$ and d-axis actual current $i_d$, and q-axis reference current $i_{qref}$ and q-axis actual current $i_q$. [3.14 rad/div], [5000 (r/min)/div], [1 A/div] and [5.000 ms/div] represent 3.14 rad in each box of the longitudinal rotor position axis, 5000 r/min in each box of the rotational speed axis, 1 A in each box of the current axis and 5 ms in each box of the transverse time axis, respectively. It can be seen from FIG. 3 that with the invention method, the permanent magnet synchronous motor can estimate more accurate rotor position and speed and run stably at 11000 r/min. The maximum fluctuation range of estimated speed is within 45 r/min, and the maximum fluctuation range of q-axis current is within 0.28 A. That is, the invention method can realize the permanent magnet synchronous motor sensorless control.

Figure 4:
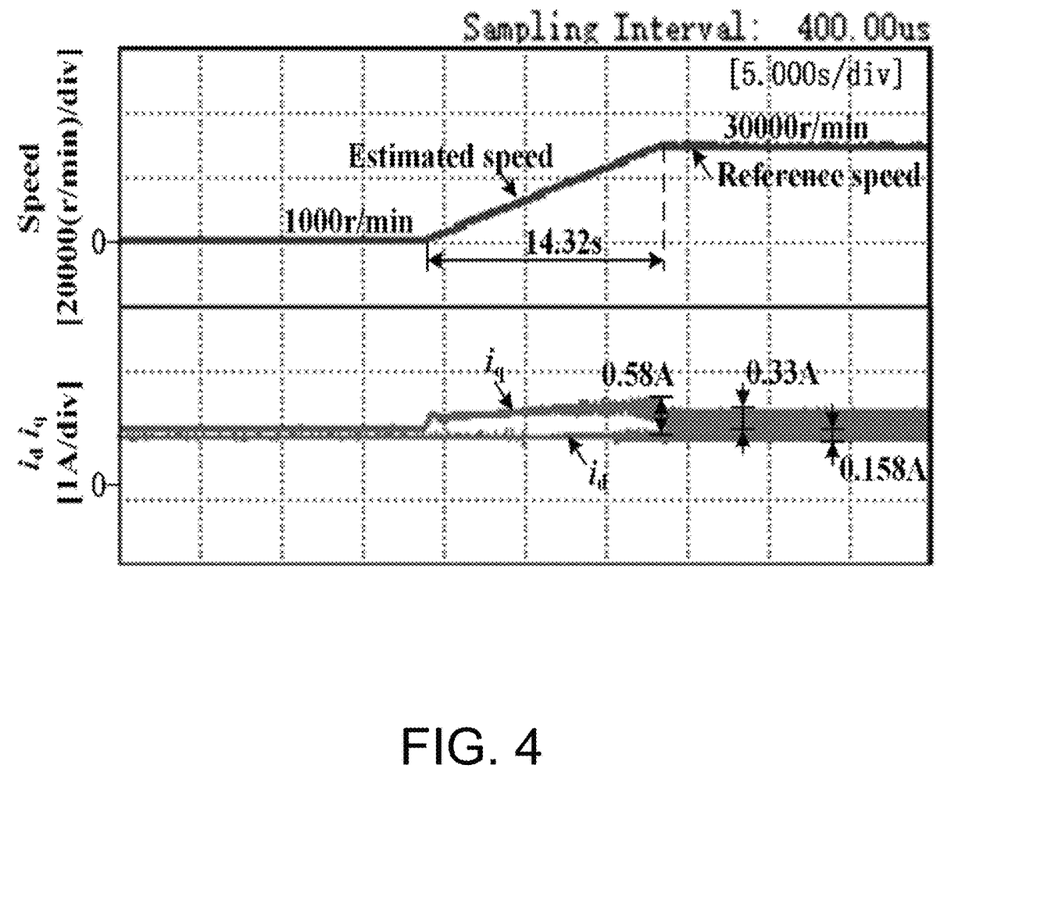
FIG. 4 is the experiment waveform showing the speed ramp increase of the method according to the invention.

As shown in FIG. 4, it is the experimental waveform of the permanent magnet synchronous motor using the invention method to increase the speed from 1000 r/min to 30000 r/min. From top to bottom are the reference speed, estimated speed, dq axis current $i_d$, and $i_q$. [2000 (r/min)/div], [1 A/div] and [5.000 s/div] represent 2000 r/min in each cell of the longitudinal speed axis, 1 A in each cell of the current axis and 5 s in each cell of the horizontal time axis represents, respectively. As can be seen from FIG. 5, it takes 14.32 s for the motor to increase its speed from 1000 r/min to 30000 r/min, during which q-axis current $i_q$ reaches a maximum value of 0.58 A. After the motor enters a steady state, the fluctuation range of the q-axis current $i_q$ is within 0.33 A and the fluctuation range of the d-axis current $i_d$ is within 0.158 A. That is, when the motor slope increases the speed, the invention method can still quickly optimize the estimated rotor position and speed, and realize the permanent magnet synchronous motor sensorless control.

To prove the advantages of the invention method, the calculation amount is compared with that of the FPS-PLL scheme proposed by other scholars, and the results are shown in Table 3.

TABLE 3

Comparison of calculation amounts

| Algorithm | FPS-PLL proposed by others | The invention method |
| --- | --- | --- |
| Optimization model | Based on back electromotive force, more complex | Based on stator current, simpler |
| Rotor polarity judgment | Yes | No |
| Number of iterations P | 9 | 6 |
| Rotor dispersion | 24 | 14(M = 6, N = 4) |
| Park times each iteration | 3 | 2 |
| error/rad | 0.00204 | 0.001077 |

It can be seen from Table 3 that compared with FPS-PLL methods proposed by others, the invention method can reduce the calculation amount on the premise of ensuring the accuracy of estimated rotor position, and is more conducive to the digital realization of the permanent magnet synchronous motor sensorless control.

The embodiment of the invention does not limit the model of other devices except for the special description of the device, as long as the device can complete the above functions. The person skilled in the art can understand that the attached drawing is only a schematic diagram of a preferred embodiment, and the serial number of the embodiment in this invention is only for description and does not represent the superiority or inferiority of the embodiment. The invention is not limited to the embodiments described above. The above description of specific embodiments is intended to describe and illustrate the technical scheme of the invention, and the above specific embodiments are only indicative and not restrictive. Without deviating from the purposes of the invention and the scope protected by claims, ordinary technicians in the field can also make specific transformations in many forms under the inspiration of the invention, which is within the protection scope of the invention.

What is claimed is:

1. A fast rotor position estimation method of a permanent magnet motor based on a N-division approach, comprising:

step 1: converting three-phase stator currents of the permanent magnet motor sampled at each period by a coordinate transform to obtain stator currents in a dq two-phase synchronous rotation coordinate system, with which an initial position area of the permanent magnet motor's rotor position is determined;

step 2: establishing a stator current cost model of the permanent magnet motor, wherein a d-axis stator current of the permanent magnet motor in the dq two-phase synchronous rotation coordinate system is inputted into the stator current cost model, and an initial rotor position of the permanent magnet motor is outputted, wherein the initial rotor position of the permanent magnet motor and its initial position region are iteratively optimized by the N-division approach to obtain an estimated rotor position and its final position region, and thereby the rotor position of the permanent magnet motor is quickly estimated, wherein in step 1:

the three-phase stator currents of the permanent magnet motor sampled at each period is converted by coordinate transform to obtain the stator currents of the permanent magnet motor in the dq two-phase synchronous rotation coordinate system, wherein A-phase stator currents $i_a$, B-phase stator currents $i_b$ and C-phase stator currents $i_c$ of the permanent magnet motors are converted by coordinate transform to obtain the a-axis stator currents $i_\alpha$ and b-axis stator currents $i_\beta$ in the ab two-phase stationary coordinate system, respectively, wherein the d-axis stator current $i_d$ and q-axis stator current $i_q$ in the dq two-phase synchronous rotation coordinate system are obtained by the coordinate transform with a-axis stator current $i_\alpha$ and b-axis stator current $i_\beta$, and wherein the initial position region of the permanent magnet motor's rotor position is determined according to the polarity of a-axis stator current $i_\alpha$, b-axis stator current $i_\beta$ and q-axis stator current $i_q$, wherein in step 2:

the initial rotor position and its initial position region of the permanent magnet motor are iteratively optimized to obtain the estimated rotor position and its final position region of the permanent magnet motor using the N-division approach, wherein a position region obtained in a current iteration is (1/(N−1)) of a position region obtained in a last iteration, wherein the estimated rotor position obtained by an iteration is as follows:

$$\hat{\theta}_i = (\theta_{(i+1)1} + \theta_{(i+1)N})/2$$

where $\hat{\theta}_i$ is a rotor position estimation value of the permanent magnet motor in the ith iteration, $q_{(i+1)1}$ and $q_{(i+1)N}$ are the first and Nth rotor position control variables of the permanent magnet motor's rotor position estimation value in the (i+1)th iteration, respectively, wherein an optimization is completed after M iterations, and a final estimated rotor position of the permanent magnet motor $\hat{\theta}(k)$ is $(q_{(M+1)1}+q_{(M+1)N})/2$, wherein the first and Nth rotor position control variables of the permanent magnet motor's rotor position estimation value in the (i+1)th iteration are:

$$\begin{cases} \theta_{(i+1)1} = \max\{\theta_{ij} \mid i_{dij}(k) < 0\} \\ \theta_{(i+1)N} = \min\{\theta_{ij} \mid i_{dij}(k) > 0\} \end{cases} i_q(k) > 0$$

$$\begin{cases} \theta_{(i+1)1} = \min\{\theta_{ij} \mid i_{dij}(k) > 0\} \\ \theta_{(i+1)N} = \max\{\theta_{ij} \mid i_{dij}(k) < 0\} \end{cases} i_q(k) < 0$$

where $\theta_{ij}$ is the jth rotor position control variable of the permanent magnet motor in the ith iteration, $i_{dij}(k)$ is the d-axis stator current in the dq two-phase synchronous rotation coordinate system of the permanent magnet motor at the kth sample period under the ith rotor position control variable in the ith iteration, $i_q(k)$ is the q-axis stator current in the dq two-phase synchronous rotation coordinate system of the permanent magnet motor at the kth sample period, wherein $\theta_{ij}$, the ith rotor position control variable of the permanent magnet motor in the ith iteration, is shown as follows:

$$\theta_{ij} = \frac{j-1}{N-1}(\theta_{iN} - \theta_{i1}) + \theta_{i1} \quad j \in \{1, 2, \dots N\}$$

where $\theta_{iN}$ and $\theta_{i1}$ are the Nth and first rotor position control variables of the rotor position estimation value for the permanent magnet motor in the ith iteration, respectively.

2. The fast rotor position estimation method according to claim 1, wherein the initial position area of the permanent magnet motor's rotor position is determined according to the polarity of the a phase current $i_\alpha$, b phase current $i_\beta$ and q phase current $i_q$, which is as shown as follows:

| $i_\alpha$ | $i_\beta$ | $i_q$ | Position area number | Initial position area |
|---|---|---|---|---|
| + | + | + | I | [1.5p, 2p] ↑ |
|   |   | − | II | [0.5p, p] ↓ |
| − | + | + | III | [0, 0.5p] ↑ |
|   |   | − | IV | [p, 1.5p] ↓ |
| − | − | + | V | [0.5p, p] ↑ |
|   |   | − | VI | [1.5p, 2p] ↓ |
| + | − | + | VII | [p, 1.5p] ↑ |
|   |   | − | VIII | [0, 0.5p] ↓ |

Where ↑ and ↓ indicate monotonically increasing and decreasing, respectively.

3. The fast rotor position estimation method according to claim 1, wherein in step 2, the stator current cost model of the permanent magnet motor is established as follows:

$$g_{op}(k) = |i_{dref}(k) - i_d(k)|$$

where $g_{op}(k)$ is the d-axis stator current error of the permanent magnet motor at the kth sample period in the dq two-phase synchronous rotation coordinate system, $i_{dref}(k)$ is the d-axis stator current reference of the permanent magnet motor at the kth sampling period in dq two-phase synchronous rotation coordinate system, $i_d(k)$ is the d-axis stator current of a permanent magnet motor at the kth sample period in the dq two-phase synchronous rotation coordinate system.

4. The fast rotor position estimation method according to claim 3, wherein the d-axis stator current of the permanent magnet motor in the dq two-phase synchronous rotation coordinate system at the kth sample period $i_d(k)$ is as follows:

$$i_d(k) = A\sin(\theta + \varphi_k)$$

where A is the stator current amplitude of the permanent magnet motor, $\theta$ is the initial rotor position of the permanent magnet motor, $\varphi_k$ is an angle between the stator current and the two-phase stationary coordinate system of the permanent magnet motor at the kth sample period.

5. The fast rotor position estimation method according to claim 4, wherein the angle between the stator current and the two-phase stationary coordinate system of the permanent magnet motor at the kth sample period $\varphi_k$ is as follows:

$$\varphi_k = \arctan(i_\alpha(k)/i_\beta(k))$$

where $i_\alpha(k)$ and $i_\beta(k)$ are the α-axis and β-axis stator currents of the permanent magnet motor at the kth sample period in αβ two-phase stationary coordinate system, respectively.

* * * * *